(12) United States Patent
Sato et al.

(10) Patent No.: US 12,523,319 B2
(45) Date of Patent: Jan. 13, 2026

(54) ABNORMALITY DETECTION SYSTEM, DETERMINATION DEVICE, ABNORMALITY DETECTION METHOD, DETERMINATION METHOD, AND PROGRAM

(71) Applicant: MITSUBISHI HEAVY INDUSTRIES THERMAL SYSTEMS, LTD., Tokyo (JP)

(72) Inventors: Hidetaka Sato, Tokyo (JP); Tomoyasu Osaki, Tokyo (JP); Keiji Nagasaka, Tokyo (JP); Ryota Kojima, Tokyo (JP)

(73) Assignee: MITSUBISHI HEAVY INDUSTRIES THERMAL SYSTEMS, LTD., Tokyo (JP)

( * ) Notice: Subject to any disclaimer, the term of this patent is extended or adjusted under 35 U.S.C. 154(b) by 231 days.

(21) Appl. No.: 18/279,571

(22) PCT Filed: Oct. 26, 2021

(86) PCT No.: PCT/JP2021/039563
§ 371 (c)(1),
(2) Date: Aug. 30, 2023

(87) PCT Pub. No.: WO2022/185605
PCT Pub. Date: Sep. 9, 2022

(65) Prior Publication Data
US 2024/0301967 A1  Sep. 12, 2024

(30) Foreign Application Priority Data
Mar. 4, 2021 (JP) .................................. 2021-034463

(51) Int. Cl.
*F16K 37/00* (2006.01)
*G01R 31/52* (2020.01)

(52) U.S. Cl.
CPC .......... *F16K 37/0083* (2013.01); *G01R 31/52* (2020.01)

(58) Field of Classification Search
CPC ............. F16K 37/0083; F16K 31/0675; F16K 37/0025; F16K 37/0075; G01R 31/52
(Continued)

(56) References Cited

U.S. PATENT DOCUMENTS 5,524,484 A * 6/1996 Sullivan .............. F16K 37/0083
73/168
2018/0003317 A1 * 1/2018 Iguchi ....................... F16K 1/36
(Continued)

FOREIGN PATENT DOCUMENTS

JP    1-244143 A    9/1989
JP    2007-10563 A  1/2007

OTHER PUBLICATIONS

International Search Report for International Application No. PCT/JP2021/039563, dated Jan. 11, 2022, with an English translation.
(Continued)

*Primary Examiner* — Giovanni Astacio-Oquendo
(74) *Attorney, Agent, or Firm* — BIRCH, STEWART, KOLASCH & BIRCH, LLP

(57) ABSTRACT

This abnormality detection system comprises: a solenoid valve; a power supply which applies a voltage to a load terminal of the solenoid valve via a switch circuit and a diode; a drive circuit which drives the solenoid valve via the load terminal; a first detection unit which detects a voltage indicating the state of the drive circuit; a second detection unit which detects a voltage associated with a voltage of the load terminal of the solenoid valve; and a determination unit which determines whether the load terminal is in a ground fault state on the basis of the detection result by the first
(Continued)

detection unit and the detection result by the second detection unit when the switch circuit is in an ON state.

12 Claims, 8 Drawing Sheets

(58) Field of Classification Search
USPC .................................... 324/512, 511, 500
See application file for complete search history.

(56) References Cited

U.S. PATENT DOCUMENTS

| 2019/0368631 | A1* | 12/2019 | Barth | G05B 23/0235 |
| 2020/0072893 | A1* | 3/2020 | Madane | F15B 19/005 |
| 2020/0132211 | A1* | 4/2020 | Sugiura | F16K 31/0655 |
| 2021/0199214 | A1* | 7/2021 | Sorlie | F16K 37/0091 |

OTHER PUBLICATIONS

Written Opinion of the International Searching Authority for International Application No. PCT/JP2021/039563, dated Jan. 11, 2022, with an English translation.

* cited by examiner

ABNORMALITY DETECTION SYSTEM, DETERMINATION DEVICE, ABNORMALITY DETECTION METHOD, DETERMINATION METHOD, AND PROGRAM

TECHNICAL FIELD

The present disclosure relates to an abnormality detection system, a determination device, an abnormality detection method, a determination method, and a program.

This application claims the priority of Japanese Patent Application No. 2021-034463 filed in Japan on Mar. 4, 2021, the content of which is incorporated herein by reference.

BACKGROUND ART

Heat pump systems are becoming widespread in various fields. In the heat pump system, an electromagnetic valve may be used.

PTL 1 discloses, as a related technique, a technique relating to a device for detecting an abnormality of a coil of an electromagnetic valve mounted in an automobile.

PTL 2 discloses, as a related technique, a technique relating to a failure diagnosis device for determining disconnection and a ground fault state of an electromagnetic valve and a harness.

CITATION LIST

Patent Literature

[PTL 1] Japanese Unexamined Patent Application Publication No. 2007-010563
[PTL 2] Japanese Unexamined Patent Application Publication No. H01-244143

SUMMARY OF INVENTION

Technical Problem

In a system in which an electromagnetic valve such as a heat pump system is used, there is a demand for a technique for detecting an abnormality including a ground fault state in a load terminal of an electromagnetic valve.

The present disclosure has been made to solve the above problems, and an object thereof is to provide an abnormality detection system, a determination device, an abnormality detection method, a determination method, and a program capable of detecting an abnormality including a ground fault state in a load terminal of an electromagnetic valve.

Solution to Problem

In order to solve the above problems, an abnormality detection system according to the present disclosure includes an electromagnetic valve, a power supply that applies a voltage to a load terminal of the electromagnetic valve via a switch circuit and a diode, a drive circuit that drives the electromagnetic valve via the load terminal, a first detecting unit that detects a voltage indicating a state of the drive circuit, a second detecting unit that detects a voltage associated with a voltage of the load terminal of the electromagnetic valve, and a determination unit that determines whether or not the load terminal is in a ground fault state based on a detection result by the first detecting unit and a detection result by the second detecting unit in a case where the switch circuit is in an ON state.

A determination device according to the present disclosure is a determination device included in an abnormality detection system that includes an electromagnetic valve, a power supply that applies a voltage to a load terminal of the electromagnetic valve via a switch circuit and a diode, and a drive circuit that drives the electromagnetic valve via the load terminal. The device includes a first detecting unit that detects a voltage indicating a state of the drive circuit, a second detecting unit that detects a voltage associated with a voltage of the load terminal of the electromagnetic valve, and a determination unit that determines whether or not the load terminal is in a ground fault state based on a detection result by the first detecting unit and a detection result by the second detecting unit in a case where the switch circuit is in an ON state.

An abnormality detection method according to the present disclosure is an abnormality detection method performed by an abnormality detection system that includes an electromagnetic valve and a power supply that applies a voltage to a load terminal of the electromagnetic valve via a switch circuit and a diode. The method includes driving the electromagnetic valve via the load terminal, detecting a voltage indicating a state of a drive circuit that drives the electromagnetic valve, detecting a voltage associated with a voltage of the load terminal of the electromagnetic valve, and determining whether or not the load terminal is in a ground fault state based on a detection result obtained by detecting the voltage indicating the state of the drive circuit and a detection result obtained by detecting the voltage associated with the voltage of the load terminal of the electromagnetic valve in a case where the switch circuit is in an ON state.

A determination method according to the present disclosure is a determination method performed by a determination device included in an abnormality detection system that includes an electromagnetic valve, a power supply that applies a voltage to a load terminal of the electromagnetic valve via a switch circuit and a diode, and a drive circuit that drives the electromagnetic valve via the load terminal. The method includes detecting a voltage indicating a state of the drive circuit, detecting a voltage associated with a voltage of the load terminal of the electromagnetic valve, and determining whether or not the load terminal is in a ground fault state based on a detection result obtained by detecting the voltage indicating the state of the drive circuit and a detection result obtained by detecting the voltage associated with the voltage of the load terminal of the electromagnetic valve in a case where the switch circuit is in an ON state.

A program according to the present disclosure causes a computer of an abnormality detection system that includes an electromagnetic valve, a power supply that applies a voltage to a load terminal of the electromagnetic valve via a switch circuit and a diode, and a drive circuit that drives the electromagnetic valve via the load terminal to execute detecting a voltage indicating a state of the drive circuit, detecting a voltage associated with a voltage of the load terminal of the electromagnetic valve, and determining whether or not the load terminal is in a ground fault state based on a detection result obtained by detecting the voltage indicating the state of the drive circuit and a detection result obtained by detecting the voltage associated with the voltage of the load terminal of the electromagnetic valve in a case where the switch circuit is in an ON state.

Advantageous Effects of Invention

According to the abnormality detection system, the determination device, the abnormality detection method, the determination method, and the program according to the present disclosure, it is possible to detect an abnormality including a ground fault state in the load terminal of the electromagnetic valve.

DESCRIPTION OF EMBODIMENTS

First Embodiment

Hereinafter, embodiments will be described in detail with reference to the drawings.

An electromagnetic valve drive system according to a first embodiment of the present disclosure will be described.

(Configuration of Electromagnetic Valve Drive System)

Figure 1:
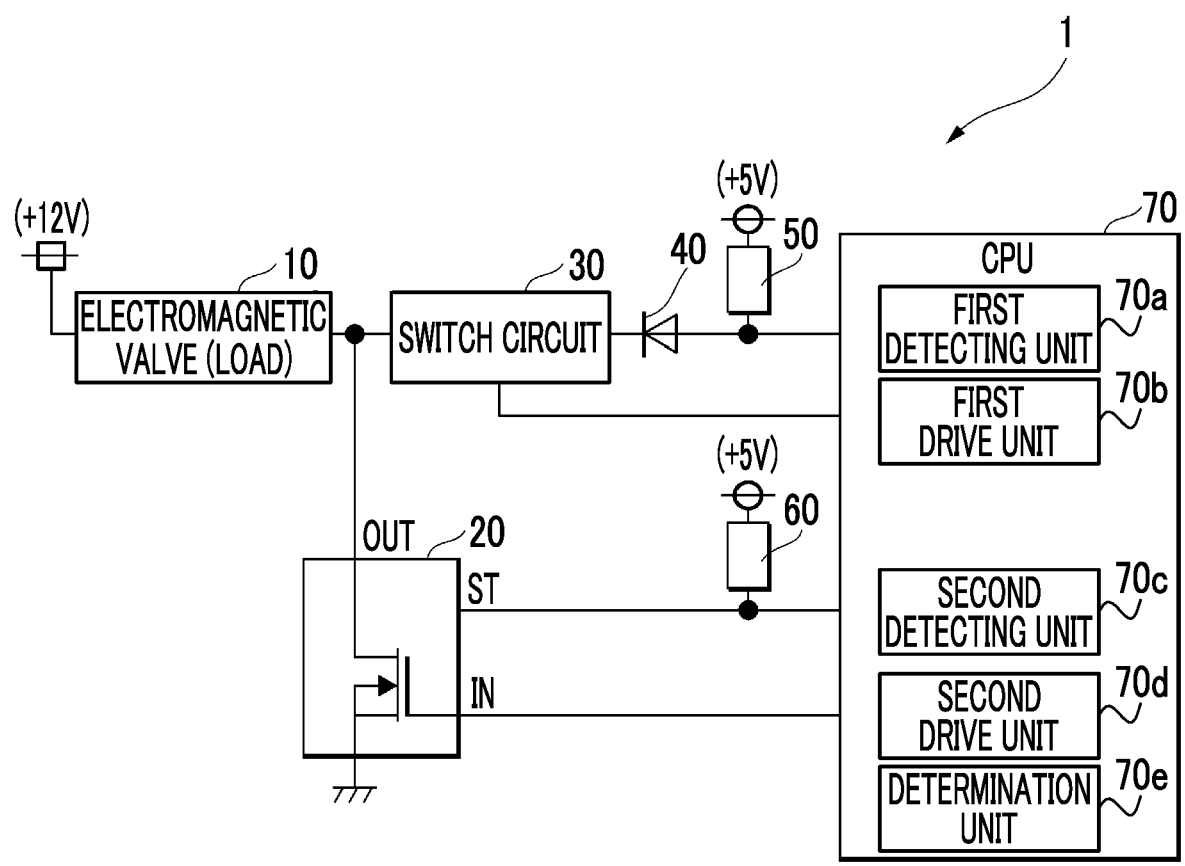
FIG. 1 is a diagram illustrating an example of a configuration of an electromagnetic valve drive system according to a first embodiment of the present disclosure.

FIG. 1 is a diagram illustrating a configuration of an electromagnetic valve drive system 1 (an example of an abnormality detection system) according to the first embodiment of the present disclosure. As illustrated in FIG. 1, the electromagnetic valve drive system 1 includes an electromagnetic valve 10, a drive circuit 20, a switch circuit 30, a diode 40, a pull-up resistor 50, a pull-up resistor 60, and a central processing unit (CPU) 70 (an example of a determination device).

The electromagnetic valve drive system 1 is a system capable of detecting an abnormality occurring in the electromagnetic valve drive system 1 including an abnormality of a ground fault state of a load terminal of the electromagnetic valve 10 serving as a load.

The electromagnetic valve 10 stops a fluid, allows the fluid to flow, and switches a flow direction of the fluid under the control of the drive circuit 20. The electromagnetic valve 10 is, for example, an electromagnetic valve used in a heat pump system included in a vehicle or the like. The electromagnetic valve 10 includes a power supply terminal and a load terminal. A power supply (+12 V in FIG. 1) is connected to the power supply terminal of the electromagnetic valve 10. The load terminal of the electromagnetic valve 10 is connected to the drive circuit 20 and the switch circuit 30.

The drive circuit 20 drives the electromagnetic valve 10 or does not drive the electromagnetic valve 10 in response to a command from the CPU 70. Further, the drive circuit 20 outputs a status indicating a state of the drive circuit 20 to the CPU 70. For example, the drive circuit 20 includes an input terminal IN, an output terminal OUT, and a status terminal ST. In a case where the command from the CPU 70 is a command not to drive the electromagnetic valve 10 (for example, Low-level voltage) and a state of the load terminal is normal, the drive circuit 20 outputs the Low-level voltage as the status from the status terminal ST to the CPU 70. Further, for example, in a case where the command from the CPU 70 is the command not to drive the electromagnetic valve 10 (for example, Low-level voltage) and the state of the load terminal is an open state, the drive circuit 20 outputs a High-level voltage as the status from the status terminal ST to the CPU 70. Further, for example, in a case where the command from the CPU 70 is a command to drive the electromagnetic valve 10 (for example, High-level voltage) and the electromagnetic valve 10 is in an overcurrent state or an overheated state, the drive circuit 20 outputs the Low-level voltage as the status from the status terminal ST to the CPU 70. Further, for example, in a case where the command from the CPU 70 is the command to drive the electromagnetic valve 10 (for example, High-level voltage) and the state of the load terminal is normal, the drive circuit 20 outputs a High-level voltage as the status from the status terminal ST to the CPU 70.

The switch circuit 30 is a circuit that is used for determining a ground fault state of the load terminal of the electromagnetic valve 10 before the electromagnetic valve 10 is normally operated (for example, immediately after the electromagnetic valve drive system 1 is powered on). The switch circuit 30 is connected to the electromagnetic valve 10, the drive circuit 20, the diode 40, and the CPU 70. The switch circuit 30 enters an ON state or an OFF state depending on the voltage received from the CPU 70. In a case where the switch circuit 30 is in an ON state, the load terminal of the electromagnetic valve 10 and a cathode of the diode 40 are short-circuited. Further, in a case where the switch circuit 30 is in an OFF state, the load terminal of the electromagnetic valve 10 and the cathode of the diode 40 are opened.

The diode 40 is connected to the switch circuit 30, the pull-up resistor 50, and the CPU 70. Specifically, the pull-up resistor 50 and a first detecting unit 70a of the CPU 70 to be described later are connected to an anode of the diode 40. Further, the switch circuit 30 is connected to the cathode of the diode 40. The diode 40 limits a direction in which a current flows. Specifically, the diode 40 causes a current to flow from the anode to the cathode and does not cause a current to flow from the cathode to the anode.

The pull-up resistor 50 is connected to a power supply (+5 V), the diode 40, and the CPU 70. Specifically, a first terminal of the pull-up resistor 50 is connected to a power supply (+5 V in FIG. 1). Further, the anode of the diode 40 and the first detecting unit 70a are connected to a second terminal of the pull-up resistor 50. The pull-up resistor 50 is a resistor for pulling up an anode of the diode 40.

The pull-up resistor 60 is connected to the power supply (+5 V), the drive circuit 20, and the CPU 70. Specifically, a first terminal of the pull-up resistor 60 is connected to a power supply (+5 V in FIG. 1). Further, a second terminal of the pull-up resistor 60 is connected to the status terminal ST of the drive circuit 20 and to a second drive unit 70d of the CPU 70 to be described later. The pull-up resistor 60 is a resistor for pulling up the status terminal ST.

As illustrated in FIG. 1, the CPU 70 includes the first detecting unit 70a, a first drive unit 70b, a second detecting unit 70c, the second drive unit 70d, and a determination unit 70e.

The first detecting unit 70a detects a voltage at the anode of the diode 40.

The first drive unit 70b controls whether to turn the switch circuit 30 on or off. Specifically, the first drive unit 70b outputs a command to turn on the switch circuit 30 (for example, High-level voltage) or a command to turn off the switch circuit 30 (for example, Low-level voltage) to the switch circuit 30.

The second detecting unit 70c detects a voltage indicating the status of the drive circuit 20 (that is, High- or Low-level voltage). For example, in a case where the command from the CPU 70 is the command not to drive the electromagnetic valve 10 (for example, Low-level voltage) and the state of the load terminal is normal, the second detecting unit 70c receives the Low-level voltage as the status from the status terminal ST. Further, for example, in a case where the command from the CPU 70 is the command not to drive the electromagnetic valve 10 (for example, Low-level voltage) and the state of the load terminal is an open state, the second detecting unit 70c receives the High-level voltage as the status from the status terminal ST. Further, for example, in a case where the command from the CPU 70 is the command to drive the electromagnetic valve 10 (for example, High-level voltage) and the electromagnetic valve 10 is in an overcurrent state or an overheated state, the second detecting unit 70c receives the Low-level voltage as the status from the status terminal ST. Further, for example, in a case where the command from the CPU 70 is the command to drive the electromagnetic valve 10 (for example, High-level voltage) and the state of the load terminal is normal, the second detecting unit 70c receives the High-level voltage as the status from the status terminal ST.

The second drive unit 70d controls whether or not to cause the drive circuit 20 to drive the electromagnetic valve 10. Specifically, the second drive unit 70d outputs a command to drive the electromagnetic valve 10 (for example, High-level voltage) or a command not to drive the electromagnetic valve 10 (for example, Low-level voltage) to the drive circuit 20. In a case where the second drive unit 70d outputs the command to drive the electromagnetic valve 10 (for example, High-level voltage) to the drive circuit 20, the drive circuit 20 drives the electromagnetic valve 10. Further, in a case where the second drive unit 70d outputs the command not to drive the electromagnetic valve 10 (for example, Low-level voltage) to the drive circuit 20, the drive circuit 20 does not drive the electromagnetic valve 10.

The determination unit 70e determines the occurrence of an abnormality in the electromagnetic valve drive system 1 based on the voltages detected by the first detecting unit 70a and the second detecting unit 70c.

Specifically, in a case where the switch circuit 30 is in an OFF state and the second drive unit 70d outputs a voltage that does not cause the drive circuit 20 to drive the electromagnetic valve 10 (for example, Low-level voltage) to the drive circuit 20, and in a case where the determination unit 70e determines that the first detecting unit 70a detects the High-level voltage and the second detecting unit 70c detects the Low-level voltage, the determination unit 70e determines that the state of the load terminal is normal.

Further, specifically, in a case where the switch circuit 30 is in an OFF state and the second drive unit 70d outputs a voltage that does not cause the drive circuit 20 to drive the electromagnetic valve 10 (for example, Low-level voltage) to the drive circuit 20, and in a case where the determination unit 70e determines that the first detecting unit 70a detects the Low-level voltage, the determination unit 70e determines that a connection destination of the input of the first detecting unit 70a is in a ground fault state regardless of the voltage detected by the second detecting unit 70c.

Further, specifically, in a case where the switch circuit 30 is in an OFF state and the second drive unit 70d outputs a voltage that does not cause the drive circuit 20 to drive the electromagnetic valve 10 (for example, Low-level voltage) to the drive circuit 20, in a case where the determination unit 70e determines that the first detecting unit 70a detects the High-level voltage and the second detecting unit 70c detects the High-level voltage and then the first drive unit 70b turns on the switch circuit 30, and in a case where the determination unit 70e determines that the first detecting unit 70a detects the High-level voltage and the second detecting unit 70c detects the Low-level voltage, the determination unit 70e determines that the load terminal is in an open state.

Further, specifically, in a case where the switch circuit 30 is in an OFF state and the second drive unit 70d outputs a voltage that does not cause the drive circuit 20 to drive the electromagnetic valve 10 (for example, Low-level voltage) to the drive circuit 20, in a case where the determination unit 70e determines that the first detecting unit 70a detects the High-level voltage and the second detecting unit 70c detects the High-level voltage and then the first drive unit 70b turns on the switch circuit 30, and in a case where the determination unit 70e determines that the first detecting unit 70a detects the Low-level voltage and the second detecting unit 70c detects the High-level voltage, the determination unit 70e determines that the load terminal is in a ground fault state.

Further, specifically, in a case where the determination unit 70e determines that the state of the load terminal is normal and then the second drive unit 70d outputs a voltage that causes the drive circuit 20 to drive the electromagnetic valve 10 (for example, High-level voltage) to the drive circuit 20, and in a case where the determination unit 70e determines that the second detecting unit 70c detects the Low-level voltage, the determination unit 70e determines that the electromagnetic valve 10 is in an overcurrent state or an overheated state.

Further, specifically, in a case where the determination unit 70e determines that the state of the load terminal is normal and then the second drive unit 70d outputs a voltage that causes the drive circuit 20 to drive the electromagnetic valve 10 (for example, High-level voltage) to the drive circuit 20 and the determination unit 70e determines that the second detecting unit 70c detects the High-level voltage, and in a case where the second drive unit 70d outputs a voltage that causes the drive circuit 20 to stop the electromagnetic valve 10 (for example, Low-level voltage) to the drive circuit 20 and the determination unit 70e determines that the second detecting unit 70c detects the High-level voltage, the determination unit 70e determines that the load terminal is in an open state.

Further, in a case where the determination unit 70e determines that the state of the load terminal is normal and then the second drive unit 70d outputs a voltage that causes the drive circuit 20 to drive the electromagnetic valve 10 (for example, High-level voltage) to the drive circuit 20 and the determination unit 70e determines that the second detecting unit 70c detects the High-level voltage, and in a case where the second drive unit 70d outputs a voltage that causes the drive circuit 20 to stop the electromagnetic valve 10 (for example, Low-level voltage) to the drive circuit 20 and the determination unit 70e determines that the second detecting unit 70c detects the Low-level voltage, the determination unit 70e determines whether or not the number of times of returning to predetermined processing (for example, processing of step S2 to be described later) reaches a predetermined number of times. In a case where the determination unit 70e determines that the number of times of returning reaches the predetermined number of times, the determination unit 70e returns to another predetermined processing (for example, processing of step S1 to be described later). The predetermined number of times may be 0 times.

(Processing Performed by Electromagnetic Valve Drive System 1)

Figure 2:
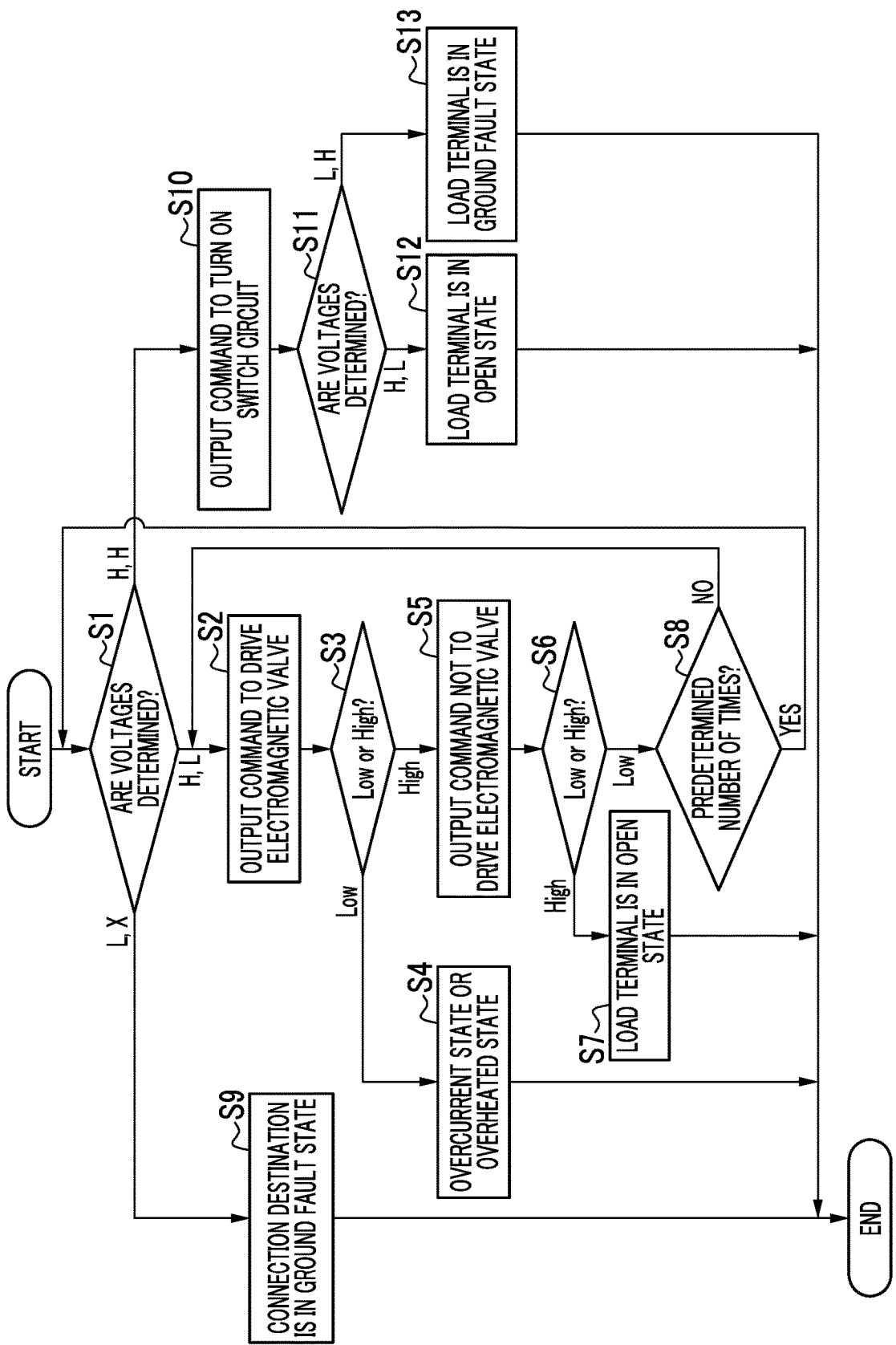
FIG. 2 is a diagram illustrating an example of a processing flow of the electromagnetic valve drive system according to the first embodiment of the present disclosure.

Next, abnormality detection processing performed by the electromagnetic valve drive system 1 will be described with reference to FIG. 2. It is assumed that the command to drive the electromagnetic valve 10 is the High-level voltage and the command not to drive the electromagnetic valve 10 is the Low-level voltage. As an initial state, it is assumed that the output of the first drive unit 70b is the Low-level voltage and the switch circuit 30 is in an OFF state, and the output of the second drive unit 70d is the Low level and the drive circuit 20 does not drive the electromagnetic valve 10. Further, it is assumed that an initial value of the number of times of returning to processing of step S6 to be described later to the processing of step S2 is 0.

Each of the first detecting unit 70a and the second detecting unit 70c detects a voltage. The determination unit 70e determines whether or not the first detecting unit 70a has the High-level voltage and the second detecting unit 70c has the Low-level voltage, whether or not the first detecting unit 70a has the High-level voltage and the second detecting unit 70c has the High-level voltage, or whether or not the first detecting unit 70a has the Low-level voltage (step S1).

In a case where it is determined that the first detecting unit 70a detects the High-level voltage and the second detecting unit 70c detects the Low-level voltage ("H, L" in step S1), the determination unit 70e determines that the state of the load terminal is normal. In a case where the determination unit 70e determines that the state of the load terminal is normal, the second drive unit 70d outputs the command to drive the electromagnetic valve 10 (that is, High-level voltage) to the drive circuit 20 (step S2).

The second detecting unit 70c detects the voltage. The determination unit 70e determines whether the voltage detected by the second detecting unit 70c is the High-level voltage or the Low-level voltage (step S3).

In a case where it is determined that the voltage detected by the second detecting unit 70c is the Low-level voltage ("Low" in step S3), the determination unit 70e determines that the electromagnetic valve 10 is in an overcurrent state or an overheated state (step S4). Further, in a case where it is determined that the voltage detected by the second detecting unit 70c is the High-level voltage ("High" in step S3), the determination unit 70e determines that the electromagnetic valve 10 is neither in the overcurrent state nor in the overheated state. In a case where the determination unit 70e determines that the electromagnetic valve 10 is in an overcurrent state or an overheated state in step S4, the second drive unit 70d may output the command not to drive the electromagnetic valve 10 (that is, Low-level voltage) to the drive circuit 20.

When the determination unit 70e determines that the electromagnetic valve 10 is neither in an overcurrent state nor in an overheated state, the second drive unit 70d outputs a command not to drive the electromagnetic valve 10 (that is, Low-level voltage) to the drive circuit 20 (step S5).

The second detecting unit 70c detects the voltage. The determination unit 70e determines whether the voltage detected by the second detecting unit 70c is the High-level voltage or the Low-level voltage (step S6).

In a case where it is determined that the voltage detected by the second detecting unit 70c is the High-level voltage ("High" in step S6), the determination unit 70e determines that the load terminal of the electromagnetic valve 10 is in an open state (step S7). Then, the determination unit 70e ends a series of processing.

Further, in a case where it is determined that the voltage detected by the second detecting unit 70c is the Low-level voltage ("Low" in step S6), the determination unit 70e determines whether or not the number of times of returning to the processing of step S2 from the processing of step S6 reaches a predetermined number of times (step S8). The predetermined number of times may be 0 times.

In a case where it is determined that the number of times of returning does not reach the predetermined number of times ("NO" in step S8), the determination unit 70e returns to the processing of step S2.

In a case where it is determined that the number of times of returning reaches the predetermined number of times ("YES" in step S8), the determination unit 70e returns to the processing of step S1.

Further, in a case where it is determined that the first detecting unit 70a detects the Low-level voltage in the processing of step ("L, X" in step S1), the determination unit 70e determines that the connection destination of the input of the first detecting unit 70a is in a ground fault state regardless of the voltage detected by the second detecting unit 70c (step S9). Then, the determination unit 70e ends a series of processing.

Further, in a case where the determination unit 70e determines that the first detecting unit 70a detects the High-level voltage and the second detecting unit 70c detects the High-level voltage in the processing of step S1 ("H, H" in step S1), the first drive unit 70b outputs a command to turn on the switch circuit 30 (that is, High-level voltage) to the switch circuit 30 (step S10).

Each of the first detecting unit 70a and the second detecting unit 70c detects a voltage. The determination unit 70e determines whether or not the first detecting unit 70a has the High-level voltage and the second detecting unit 70c has the Low-level voltage, or whether or not the first detecting unit 70a has the Low-level voltage and the second detecting unit 70c has the High-level voltage (step S11).

In a case where it is determined that the first detecting unit 70a has the High-level voltage and the second detecting unit 70c has the Low-level voltage ("H, L" in step S11), the determination unit 70e determines that the load terminal is in an open state (step S12).

In a case where it is determined that the first detecting unit 70a has the Low-level voltage and the second detecting unit 70c has the High-level voltage ("L, H" in step S11), the determination unit 70e determines that the load terminal is in a ground fault state (step S13).

(Effects)

The electromagnetic valve drive system 1 according to the first embodiment of the present disclosure has been described above. The electromagnetic valve drive system 1 includes the electromagnetic valve 10, the power supply (+5 V), the drive circuit 20, the first detecting unit 70a, the second detecting unit 70c, and the determination unit 70e. The power supply (+5 V) applies the voltage to the load terminal of the electromagnetic valve 10 via the switch circuit 30 and the diode 40. The drive circuit 20 drives the electromagnetic valve 10 via the load terminal. The first detecting unit 70a detects the voltage indicating the state of the drive circuit 20. The second detecting unit 70c detects the voltage associated with the voltage of the load terminal of the electromagnetic valve 10. In a case where the switch circuit 30 is in an ON state, the determination unit 70e determines whether or not the load terminal is in a ground fault state based on the detection result by the first detecting unit 70a and the detection result by the second detecting unit 70c.

Accordingly, the electromagnetic valve drive system 1 according to the first embodiment can detect the abnormality including the ground fault state in the load terminal of the electromagnetic valve.

First Modification Example of First Embodiment

Figure 3:
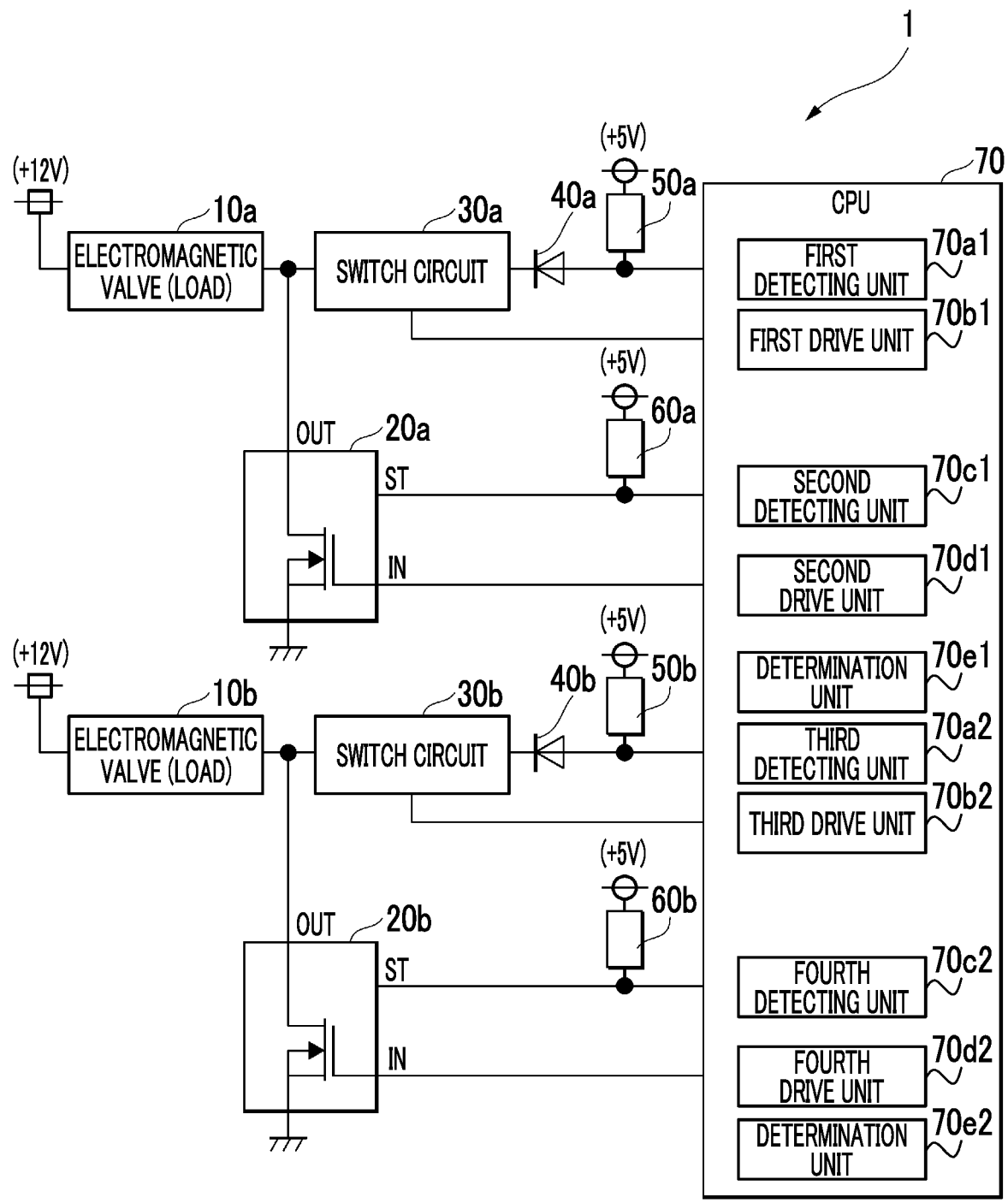
FIG. 3 is a diagram illustrating an example of a configuration of an electromagnetic valve drive system according to a first modification example of the first embodiment of the present disclosure.

FIG. 3 is a diagram illustrating an example of a configuration of an electromagnetic valve drive system 1 according to a first modification example of the first embodiment of the present disclosure. The electromagnetic valve drive system 1 according to the first modification example of the first embodiment may include a plurality of electromagnetic valves 10, and may include drive circuits 20, switch circuits 30, diodes 40, pull-up resistors 50, and pull-up resistors 60, which are increased in accordance with the number of electromagnetic valves 10. For example, as illustrated in FIG. 3, the electromagnetic valve drive system 1 according to the first modification example of the first embodiment may include electromagnetic valves 10a and 10b, drive circuits 20a and 20b, switch circuits 30a and 30b, diodes 40a and 40b, pull-up resistors 50a and 50b, pull-up resistors 60a and 60b, and a CPU 70. That is, the electromagnetic valve drive system 1 according to the first modification example of the first embodiment includes two electromagnetic valves 10a and 10b corresponding to the electromagnetic valve 10 of the first embodiment, and the drive circuit 20a, the switch circuit 30a, the diode 40a, the pull-up resistor 50a, and the pull-up resistor 60a corresponding to the electromagnetic valve 10a. Further, the electromagnetic valve drive system 1 according to the first modification example of the first embodiment includes the drive circuit 20b, the switch circuit 30b, the diode 40b, the pull-up resistor 50b, and the pull-up resistor 60b corresponding to the electromagnetic valve 10b. Further, the CPU 70 includes a first detecting unit 70a1 and a third detecting unit 70a2 corresponding to the first detecting unit 70a, a first drive unit 70b1 and a third drive unit 70b2 corresponding to the first drive unit 70b, a second detecting unit 70c1 and a fourth detecting unit 70c2 corresponding to the second detecting unit 70c, a second drive unit 70d1 and a fourth drive unit 70d2 corresponding to the second drive unit 70d, and a determination unit 70e1 and a determination unit 70e2 corresponding to the determination unit 70e. The first detecting unit 70a1, the first drive unit 70b1, the second detecting unit 70c1, the second drive unit 70d1, and the determination unit 70e1 correspond to the electromagnetic valve 10a. Further, the first detecting unit 70a1, the first drive unit 70b1, the second detecting unit 70c1, the second drive unit 70d1, and the determination unit 70e2 correspond to the electromagnetic valve 10b.

Either one of the determination units 70e1 and 70e2 also performs the determination of the other, that is, either one of the determination units 70e1 and 70e2 may correspond to both of the electromagnetic valves 10a and 10b.

(Effects)

The electromagnetic valve drive system 1 according to the first modification example of the first embodiment of the present disclosure has been described above. Even in a case where the number of the plurality of electromagnetic valves increases, the electromagnetic valve drive system 1 according to the first modification example of the first embodiment of the present disclosure can detect the abnormality similarly to the electromagnetic valve drive system 1 of the first embodiment.

Second Modification Example of First Embodiment

Figure 4:
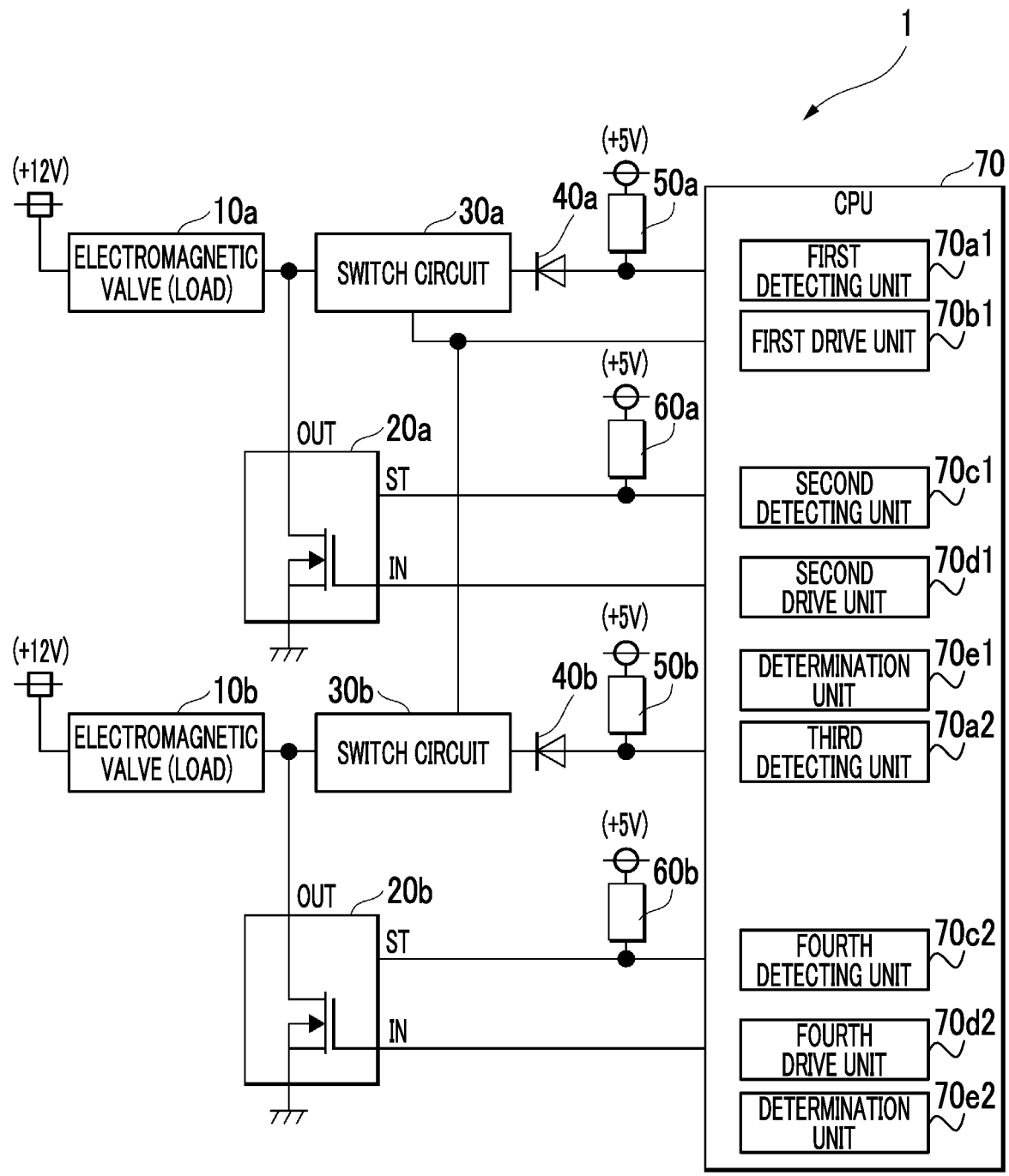
FIG. 4 is a diagram illustrating an example of a configuration of an electromagnetic valve drive system according to a second modification example of the first embodiment of the present disclosure.

FIG. 4 is a diagram illustrating an example of a configuration of an electromagnetic valve drive system 1 according to a second modification example of the first embodiment of the present disclosure. As illustrated in FIG. 4, the electromagnetic valve drive system 1 according to the second modification example of the first embodiment is a system in which the first drive unit 70b1 outputs a voltage to the switch circuit 30b instead of the third drive unit 70b2 illustrated in FIG. 3.

Similarly to the electromagnetic valve drive system 1 according to the first modification example of the first embodiment, either one of the determination units 70e1 and 70e2 may also perform the determination of the other, that is, either one of the determination units 70e1 and 70e2 may correspond to both of the electromagnetic valves 10a and 10b.

(Effects)

The electromagnetic valve drive system 1 according to the second modification example of the first embodiment of the present disclosure has been described above. The electromagnetic valve drive system 1 according to the second modification example of the first embodiment of the present disclosure can reduce the number of drive units that drive the switch circuits by providing the common drive unit that supplies the voltage to the plurality of switch circuits as compared with the electromagnetic valve drive system 1 according to the first modification example of the first embodiment.

Second Embodiment

An electromagnetic valve drive system according to a second embodiment of the present disclosure will be described.

(Configuration of Electromagnetic Valve Drive System)

Figure 5:
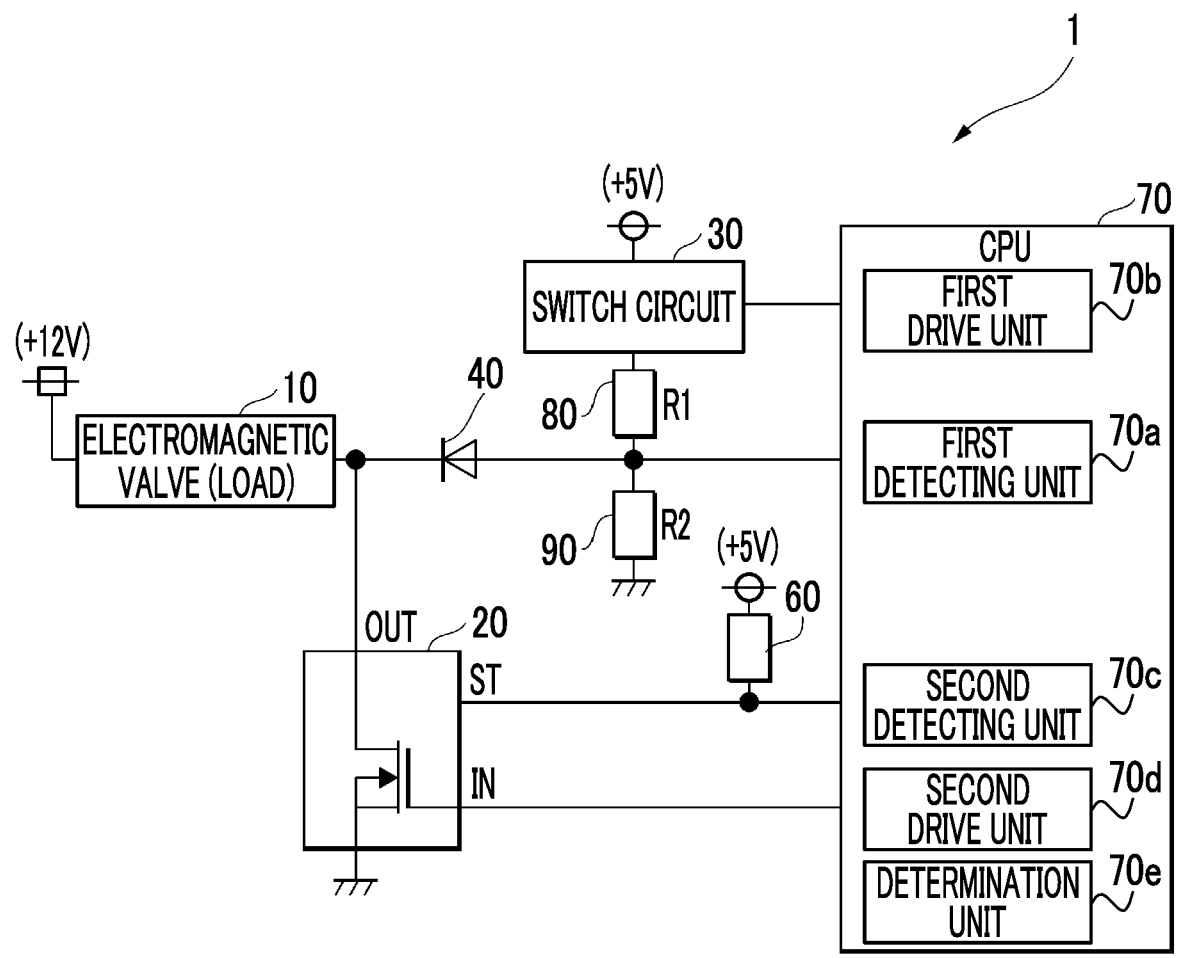
FIG. 5 is a diagram illustrating an example of a configuration of an electromagnetic valve drive system according to a second embodiment of the present disclosure.

FIG. 5 is a diagram illustrating a configuration of an electromagnetic valve drive system 1 according to the second embodiment of the present disclosure. As illustrated in FIG. 5, the electromagnetic valve drive system 1 includes an electromagnetic valve 10, a drive circuit 20, a switch circuit 30, a diode 40, a pull-up resistor 60, a CPU 70, and resistors 80 and 90.

The electromagnetic valve drive system 1 is a system capable of detecting an abnormality occurring in the electromagnetic valve drive system 1 including an abnormality of a ground fault state of a load terminal of the electromagnetic valve 10 serving as a load.

The electromagnetic valve 10 stops a fluid, allows the fluid to flow, and switches a flow direction of the fluid under the control of the drive circuit 20. The electromagnetic valve 10 is, for example, an electromagnetic valve used in a heat pump system. The electromagnetic valve 10 includes a power supply terminal and a load terminal. A power supply (+12 V in FIG. 5) is connected to the power supply terminal of the electromagnetic valve 10. The load terminal of the electromagnetic valve 10 is connected to the drive circuit 20 and the diode 40.

The drive circuit 20 drives the electromagnetic valve 10 or does not drive the electromagnetic valve 10 in response to a command from the CPU 70. Further, the drive circuit 20 outputs a status indicating a state of the drive circuit 20 to the CPU 70. For example, the drive circuit 20 includes an input terminal IN, an output terminal OUT, and a status terminal ST. In a case where the command from the CPU 70 is a command not to drive the electromagnetic valve 10 (for example, Low-level voltage) and a state of the load terminal is normal, the drive circuit 20 outputs the Low-level voltage as the status from the status terminal ST to the CPU 70. Further, for example, in a case where the command from the CPU 70 is the command not to drive the electromagnetic valve 10 (for example, Low-level voltage) and the state of the load terminal is an open state, the drive circuit 20 outputs a High-level voltage as the status from the status terminal ST to the CPU 70. Further, for example, in a case where the command from the CPU 70 is a command to drive the electromagnetic valve 10 (for example, High-level voltage) and the electromagnetic valve 10 is in an overcurrent state or an overheated state, the drive circuit 20 outputs the Low-level voltage as the status from the status terminal ST to the CPU 70. Further, for example, in a case where the command from the CPU 70 is the command to drive the electromagnetic valve 10 (for example, High-level voltage) and the state of the load terminal is normal, the drive circuit 20 outputs a High-level voltage as the status from the status terminal ST to the CPU 70.

The switch circuit 30 is a circuit that is used for determining a ground fault state of the load terminal of the electromagnetic valve 10 before the electromagnetic valve 10 is normally operated (for example, immediately after the electromagnetic valve drive system 1 is powered on). The switch circuit 30 is connected to a power supply (+5 V), the CPU 70, and the resistor 80. The switch circuit 30 is, for example, a PNP type (for example, 2SA) digital transistor. The switch circuit 30 enters an ON state or an OFF state depending on the voltage received from the CPU 70. In a case where the switch circuit 30 is in an ON state, the power supply (+5 V) and the resistor 80 are short-circuited. Further, the switch circuit 30 opens the power supply (+5 V) and the resistor 80 in an OFF state.

The diode 40 is connected to the electromagnetic valve 10, the drive circuit 20, the CPU 70, and the resistors 80 and 90. Specifically, a first detecting unit 70a of the CPU 70 and the resistors 80 and 90 are connected to an anode of the diode 40. Further, the electromagnetic valve 10 and the drive circuit 20 are connected to a cathode of the diode 40. The diode 40 limits a direction in which a current flows. Specifically, the diode 40 causes a current to flow from the anode to the cathode and does not cause a current to flow from the cathode to the anode.

The pull-up resistor 60 is connected to the power supply (+5 V), the drive circuit 20, and the CPU 70. Specifically, a first terminal of the pull-up resistor 60 is connected to the power supply (+5 V in FIG. 5). Further, a second terminal of the pull-up resistor 60 is connected to a status terminal ST of the drive circuit 20 and to a second drive unit 70d of the CPU 70. The pull-up resistor 60 is a resistor for pulling up the status terminal ST.

A first terminal of the resistor 80 is connected to the switch circuit 30. A second terminal of the resistor 80 is connected to the anode of the diode 40, the first detecting unit 70a of the CPU 70, and a first terminal of the resistor 90. A second terminal of the resistor 90 is connected to the ground. The resistors 80 and 90 set bias voltages such that the anode of the diode 40 has a High-level voltage in a case where the switch circuit 30 is in an ON state and the anode of the diode 40 has a Low-level voltage in a case where the switch circuit 30 is in an OFF state. That is, a resistance value R1 of the resistor 80 is set to be sufficiently smaller than a resistance value R2 of the resistor 90.

As illustrated in FIG. 5, the CPU 70 includes the first detecting unit 70a, a first drive unit 70b, a second detecting unit 70c, the second drive unit 70d, and a determination unit 70e.

The first detecting unit 70a detects a voltage at the anode of the diode 40.

The first drive unit 70b controls whether to turn the switch circuit 30 on or off. Specifically, the first drive unit 70b outputs a command to turn on the switch circuit 30 (for example, Low-level voltage) or a command to turn off the switch circuit 30 (for example, High-level voltage) to the switch circuit 30.

The second detecting unit 70c detects a voltage indicating the status of the drive circuit 20 (that is, High-level or Low-level voltage). For example, in a case where the command from the CPU 70 is the command not to drive the electromagnetic valve 10 (for example, Low-level voltage) and the state of the load terminal is normal, the second detecting unit 70c receives the Low-level voltage as the status from the status terminal ST. Further, for example, in a case where the command from the CPU 70 is the command not to drive the electromagnetic valve 10 (for example, Low-level voltage) and the state of the load terminal is an open state, the second detecting unit 70c receives the High-level voltage as the status from the status terminal ST. Further, for example, in a case where the command from the CPU 70 is the command to drive the electromagnetic valve 10 (for example, High-level voltage) and the electromagnetic valve 10 is in an overcurrent state or an overheated state, the second detecting unit 70c receives the Low-level voltage as the status from the status terminal ST. Further, for example, in a case where the command from the CPU 70 is the command to drive the electromagnetic valve 10 (for example, High-level voltage) and the state of the load terminal is normal, the second detecting unit 70c receives the High-level voltage as the status from the status terminal ST.

The second drive unit 70d controls whether or not to cause the drive circuit 20 to drive the electromagnetic valve 10. Specifically, the second drive unit 70d outputs a command to drive the electromagnetic valve 10 (for example, High-level voltage) or a command not to drive the electromagnetic valve 10 (for example, Low-level voltage) to the drive circuit 20. In a case where the second drive unit 70d outputs the command to drive the electromagnetic valve 10 (for example, High-level voltage) to the drive circuit 20, the drive circuit 20 drives the electromagnetic valve 10. Further, in a case where the second drive unit 70d outputs the command not to drive the electromagnetic valve 10 (for example, Low-level voltage) to the drive circuit 20, the drive circuit 20 does not drive the electromagnetic valve 10.

The determination unit 70e determines the occurrence of an abnormality in the electromagnetic valve drive system 1 based on the voltages detected by the first detecting unit 70a and the second detecting unit 70c.

Specifically, in a case where the switch circuit 30 is in an OFF state and the second drive unit 70d outputs a voltage that does not cause the drive circuit 20 to drive the electromagnetic valve 10 (for example, Low-level voltage) to the drive circuit 20, and in a case where the determination unit 70e determines that the first detecting unit 70a detects the Low-level voltage and the second detecting unit 70c detects the Low-level voltage, the determination unit 70e determines that the state of the load terminal is normal.

Further, specifically, in a case where the switch circuit 30 is in an OFF state and the second drive unit 70d outputs a voltage that does not cause the drive circuit 20 to drive the electromagnetic valve 10 (for example, Low-level voltage) to the drive circuit 20, and in a case where the determination unit 70e determines that the first detecting unit 70a detects the High-level voltage, the determination unit 70e determines that the diode 40 or the switch circuit 30 is short-circuited regardless of the voltage detected by the second detecting unit 70c.

Further, specifically, in a case where the switch circuit 30 is in an OFF state and the second drive unit 70d outputs a voltage that does not cause the drive circuit 20 to drive the electromagnetic valve 10 (for example, Low-level voltage) to the drive circuit 20, in a case where the determination unit 70e determines that the first detecting unit 70a detects the Low-level voltage and the second detecting unit 70c detects the High-level voltage and then the first drive unit 70b turns on the switch circuit 30, and in a case where the determination unit 70e determines that the first detecting unit 70a detects the Low-level voltage and the second detecting unit 70c detects the High-level voltage, the determination unit 70e determines that the load terminal is in a ground fault state.

Further, specifically, in a case where the switch circuit 30 is in an OFF state and the second drive unit 70d outputs a voltage that does not cause the drive circuit 20 to drive the electromagnetic valve 10 (for example, Low-level voltage) to the drive circuit 20, in a case where the determination unit 70e determines that the first detecting unit 70a detects the Low-level voltage and the second detecting unit 70c detects the High-level voltage and then the first drive unit 70b turns on the switch circuit 30, and in a case where the determination unit 70e determines that the first detecting unit 70a detects the High-level voltage and the second detecting unit 70c detects the Low-level voltage, the determination unit 70e determines that the load terminal is in an open state.

Further, specifically, in a case where the determination unit 70e determines that the state of the load terminal is normal and then the second drive unit 70d outputs a voltage that causes the drive circuit 20 to drive the electromagnetic valve 10 (for example, High-level voltage) to the drive circuit 20, and in a case where the determination unit 70e determines that the second detecting unit 70c detects the Low-level voltage, the determination unit 70e determines that the electromagnetic valve 10 is in an overcurrent state or an overheated state.

Further, specifically, in a case where the determination unit 70e determines that the state of the load terminal is normal and then the second drive unit 70d outputs a voltage that causes the drive circuit 20 to drive the electromagnetic valve 10 (for example, High-level voltage) to the drive circuit 20 and the determination unit 70e determines that the second detecting unit 70c detects the High-level voltage, and in a case where the second drive unit 70d outputs a voltage that does not cause the drive circuit 20 to drive the electromagnetic valve 10 (for example, Low-level voltage) to the drive circuit 20 and the determination unit 70e determines that the second detecting unit 70c detects the High-level voltage, the determination unit 70e determines that the load terminal is in an open state.

Further, in a case where the determination unit 70e determines that the state of the load terminal is normal and then the second drive unit 70d outputs a voltage that causes the drive circuit 20 to drive the electromagnetic valve 10 (for example, High-level voltage) to the drive circuit 20 and the determination unit 70e determines that the second detecting unit 70c detects the High-level voltage, and in a case where the second drive unit 70d outputs a voltage that does not cause the drive circuit 20 to drive the electromagnetic valve 10 (for example, Low-level voltage) to the drive circuit 20 and the determination unit 70e determines that the second detecting unit 70c detects the Low-level voltage, determination unit 70e determines whether t the number of times of returning to predetermined processing (for example, processing of step S22 to be described later) reaches a predetermined number of times. In a case where it is determined that the number of times of returning reaches the predetermined number of times, the determination unit 70e returns to another predetermined processing (for example, processing of step S21 to be described later). The predetermined number of times may be 0 times.

(Processing Performed by Electromagnetic Valve Drive System 1)

Figure 6:
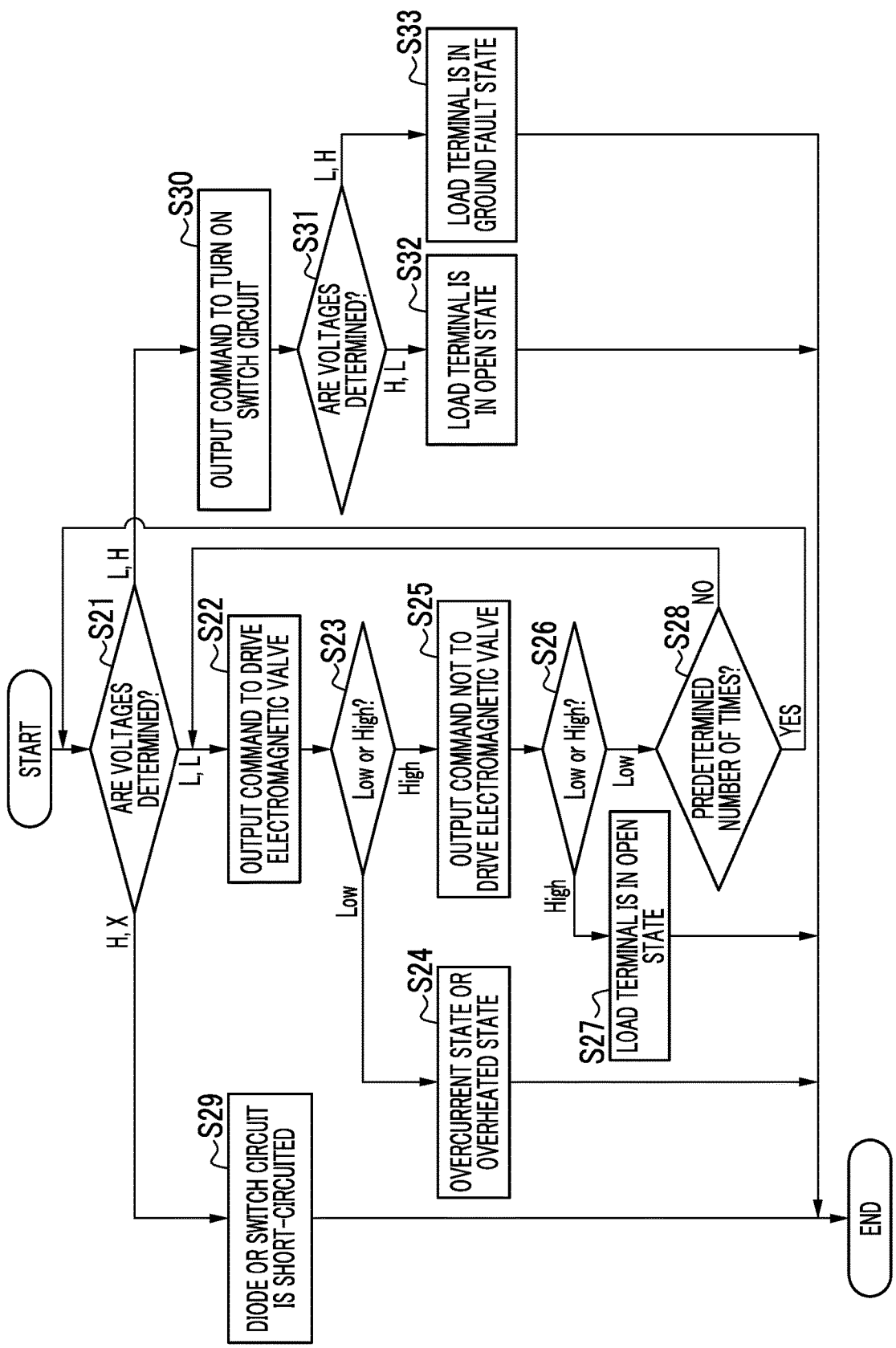
FIG. 6 is a diagram illustrating an example of a processing flow of the electromagnetic valve drive system according to the second embodiment of the present disclosure.

Next, abnormality detection processing performed by the electromagnetic valve drive system 1 will be described with reference to FIG. 6. It is assumed that the command to drive the electromagnetic valve 10 is the High-level voltage and the command not to drive the electromagnetic valve 10 is the Low-level voltage. As an initial state, it is assumed that the output of the first drive unit 70b is the High-level voltage and the switch circuit 30 is in an OFF state, and the output of the second drive unit 70d is the Low level and the drive circuit 20 does not drive the electromagnetic valve 10. Further, it is assumed that an initial value of the number of times of returning from processing of step S26 to processing of step S22 to be described later is 0.

Each of the first detecting unit 70a and the second detecting unit 70c detects a voltage. The determination unit 70e determines whether or not the first detecting unit 70a has the Low-level voltage and the second detecting unit 70c has the Low-level voltage, whether or not the first detecting unit 70a has the Low-level voltage and the second detecting unit 70c has the High-level voltage, or whether or not the first detecting unit 70a has the High-level voltage (step S21).

In a case where it is determined that the first detecting unit 70a detects the Low-level voltage and the second detecting unit 70c detects the Low-level voltage ("L, L" in step S1), the determination unit 70e determines that the state of the load terminal is normal. In a case where the determination unit 70e determines that the state of the load terminal is normal, the second drive unit 70d outputs a command to drive the electromagnetic valve 10 (that is, High-level voltage) to the drive circuit 20 (step S22).

The second detecting unit 70c detects the voltage. The determination unit 70e determines whether the voltage detected by the second detecting unit 70c is the High-level voltage or the Low-level voltage (step S23).

In a case where it is determined that the voltage detected by the second detecting unit 70c is the Low-level voltage ("Low" in step S23), the determination unit 70e determines that the electromagnetic valve 10 is in an overcurrent state or an overheated state (step S24). Further, in a case where it is determined that the voltage detected by the second detecting unit 70c is the High-level voltage ("High" in step S23), the determination unit 70e determines that the electromagnetic valve 10 is neither in an overcurrent state nor in an overheated state.

In a case where the determination unit 70e determines that the electromagnetic valve 10 is neither in an overcurrent state nor in an overheated state, the second drive unit 70d outputs a command not to drive the electromagnetic valve 10 (that is, Low-level voltage) to the drive circuit 20 (step S25).

The second detecting unit 70c detects the voltage. The determination unit 70e determines whether the voltage detected by the second detecting unit 70c is the High-level voltage or the Low-level voltage (step S26).

In a case where it is determined that the voltage detected by the second detecting unit 70c is the High-level voltage ("High" in step S26), the determination unit 70e determines that the load terminal of the electromagnetic valve 10 is in an open state (step S27). Then, the determination unit 70e ends a series of processing.

Further, in a case where it is determined that the voltage detected by the second detecting unit 70c is the Low-level voltage ("Low" in step S26), the determination unit 70e determines whether or not the number of times of returning to the processing of step S26 to the processing of step S22 reaches a predetermined number of times (step S28). The predetermined number of times may be 0 times.

In a case where it is determined that the number of times of returning does not reach the predetermined number of times ("NO" in step S28), the determination unit 70e returns to the processing of step S22.

In a case where it is determined that the number of times of returning reaches the predetermined number of times ("YES" in step S28), the determination unit 70e returns to the processing of step S21.

Further, in a case where it is determined that the first detecting unit 70a detects the High-level voltage in the processing of step S21 ("H, X" in step S21), the determination unit 70e determines that the diode 40 or the switch circuit 30 is short-circuited regardless of the voltage detected by the second detecting unit 70c (step S29). Then, the determination unit 70e ends a series of processing.

Further, in a case where the determination unit 70e determines that the first detecting unit 70a detects the Low-level voltage and the second detecting unit 70c detects the High-level voltage in the processing of step S21 ("L, H" in step S21), the first drive unit 70b outputs a command to turn on the switch circuit 30 (that is, High-level voltage) to the switch circuit 30 (step S30).

Each of the first detecting unit 70a and the second detecting unit 70c detects a voltage. The determination unit 70e determines whether or not the first detecting unit 70a has the Low-level voltage and the second detecting unit 70c has the High-level voltage, or whether or not the first detecting unit 70a has the High-level voltage and the second detecting unit 70c has the Low-level voltage (step S31).

In a case where it is determined that the first detecting unit 70a has the High-level voltage and the second detecting unit 70c has the Low-level voltage ("H, L" in step S31), the determination unit 70e determines that the load terminal is in an open state (step S32).

In a case where it is determined that the first detecting unit 70a has the Low-level voltage and the second detecting unit 70c has the High-level voltage ("L, H" in step S31), the determination unit 70e determines that the load terminal is in a ground fault state (step S33).

(Effects)

The electromagnetic valve drive system 1 according to the second embodiment of the present disclosure has been described above. The electromagnetic valve drive system 1 includes the electromagnetic valve 10, the power supply (+5 V), the drive circuit 20, the first detecting unit 70a, the second detecting unit 70c, and the determination unit 70e. The power supply (+5 V) applies the voltage to the load terminal of the electromagnetic valve 10 via the switch circuit 30 and the diode 40. The drive circuit 20 drives the electromagnetic valve 10 via the load terminal. The first detecting unit 70a detects the voltage indicating the state of the drive circuit 20. The second detecting unit 70c detects the voltage associated with the voltage of the load terminal of the electromagnetic valve 10. In a case where the switch circuit 30 is in an ON state, the determination unit 70e determines whether or not the load terminal is in a ground fault state based on the detection result by the first detecting unit 70a and the detection result by the second detecting unit 70c.

Accordingly, the electromagnetic valve drive system 1 according to the second embodiment can detect the abnormality including the ground fault state in the load terminal of the electromagnetic valve.

First Modification Example of Second Embodiment

Figure 7:
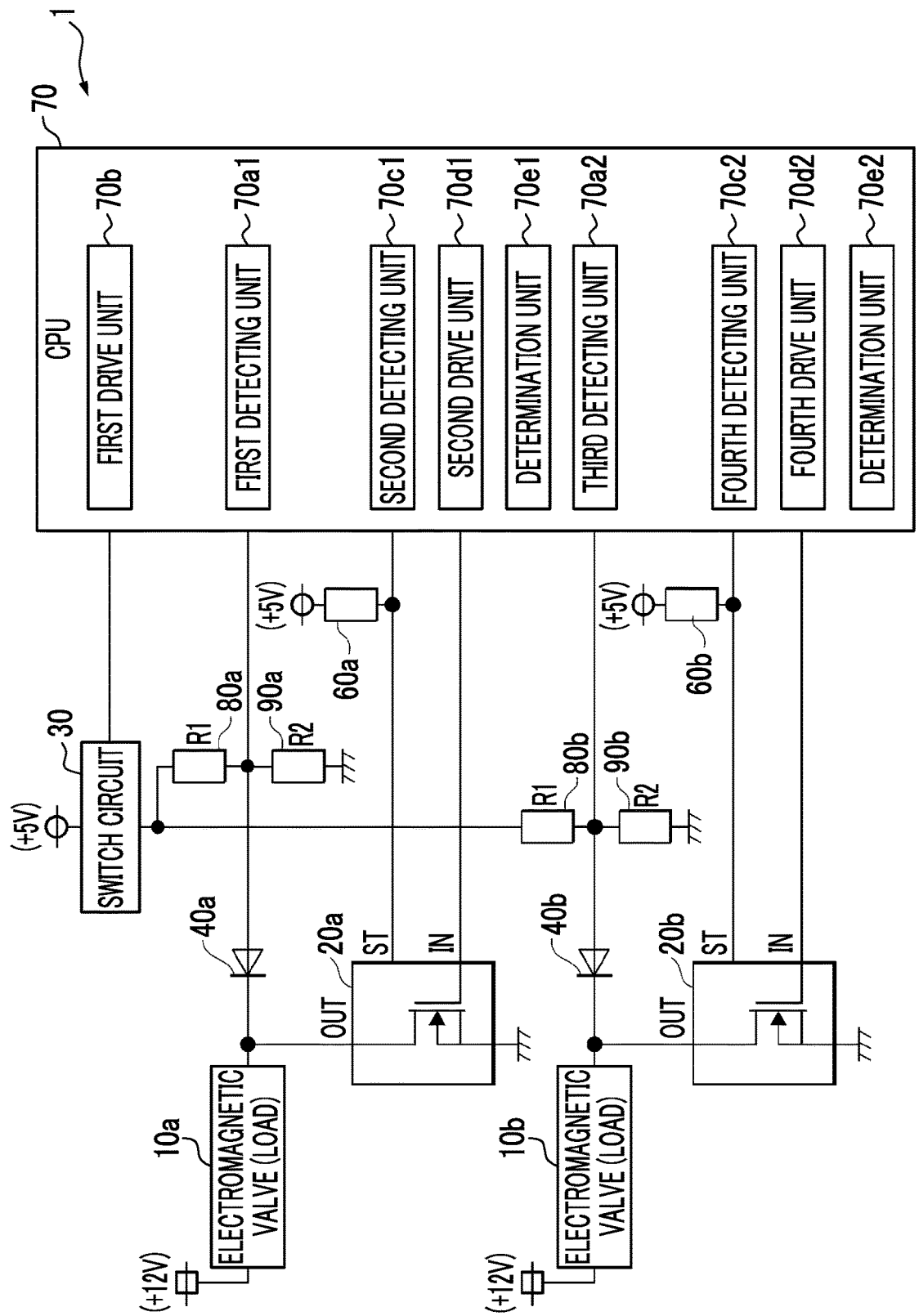
FIG. 7 is a diagram illustrating an example of a configuration of an electromagnetic valve drive system according to a first modification example of the second embodiment of the present disclosure.

FIG. 7 is a diagram illustrating an example of a configuration of an electromagnetic valve drive system 1 according to a first modification example of the second embodiment of the present disclosure. The electromagnetic valve drive system 1 according to the first modification example of the second embodiment may include a plurality of electromagnetic valves 10, and may include drive circuits 20, diodes 40, and pull-up resistors 60, which are increased in accordance with the number of the electromagnetic valves 10. For example, as illustrated in FIG. 7, the electromagnetic valve drive system 1 according to the first modification example of the second embodiment may include two electromagnetic valves 10 (10a and 10b) and drive circuits 20 (20a and 20b), a switch circuit 30, diodes 40 (40a and 40b), pull-up resistors 60 (60a and 60b), a CPU 70, and resistors 80 (80a and 80b) and 90 (90a and 90b), which are increased in accordance with two electromagnetic valves 10. That is, the electromagnetic valve drive system 1 according to the first modification example of the second embodiment includes two electromagnetic valves 10a and 10b corresponding to the electromagnetic valves 10 of the second embodiment, and includes the drive circuit 20a, the diode 40a, the pull-up resistor 60a, and the resistors 80a and 90a corresponding to the electromagnetic valves 10a. Further, the electromagnetic valve drive system 1 according to the first modification example of the second embodiment includes the drive circuit 20b, the diode 40b, the pull-up resistor 60b, and the resistors 80b and 90b corresponding to the electromagnetic valve 10b. Further, the CPU 70 includes a first detecting unit 70a1 and a third detecting unit 70a2 corresponding to the first detecting unit 70a in FIG. 5, a second detecting unit 70c1 and a fourth detecting unit 70c2 corresponding to the second detecting unit 70c, a second drive unit 70d1 and a fourth drive unit 70d2 corresponding to the second drive unit 70d, and a determination unit 70e1 and a determination unit 70e2 corresponding to the determination unit 70e. The electromagnetic valve drive system 1 according to the first modification example of the second embodiment includes the switch circuit 30 similarly to the electromagnetic valve drive system 1 according to the second embodiment. The kinds of processing performed by the determination unit 70e1 and the determination unit 70e2 may be performed by, for example, one determination unit. For example, the electromagnetic valve drive system 1 may include the determination unit

70e1 as the determination unit, and the determination unit 70e1 may also perform the processing of the determination unit 70e2.

(Effects)

The electromagnetic valve drive system 1 according to the first modification example of the second embodiment of the present disclosure has been described above. Even in a case where the number of the plurality of electromagnetic valves increases, the electromagnetic valve drive system 1 according to the first modification example of the second embodiment of the present disclosure can detect the abnormality similarly to the electromagnetic valve drive system 1 of the second embodiment.

In the processing according to the embodiment of the present disclosure, the order of the kinds of processing may be changed within a range in which appropriate processing is performed.

Each of the storage unit and the storage device (including register and a latch) according to the embodiments of the present disclosure may be provided anywhere within a range in which appropriate information is transmitted and received. Further, each of the storage unit and the storage device may be present in places within a range in which appropriate information is transmitted and received, and may distribute and store data.

Although the embodiments of the present disclosure have been described, the above-described electromagnetic valve drive system 1 and other control devices may have a computer system therein. The procedures of the above-mentioned kinds of processing are stored in a computer-readable recording medium in a form of a program, and the above-mentioned kinds of processing are performed by the computer reading and executing this program. A specific example of a computer is illustrated below.

Figure 8:
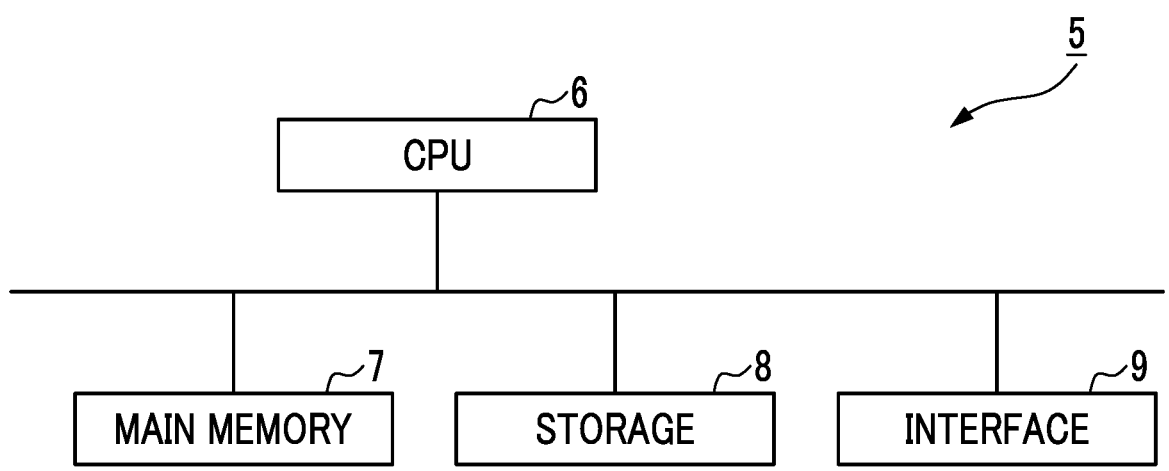
FIG. 8 is a schematic block diagram illustrating a configuration of a computer according to at least one embodiment.

FIG. 8 is a schematic block diagram illustrating a configuration of a computer according to at least one embodiment.

As illustrated in FIG. 8, a computer 5 includes a CPU 6, a main memory 7, a storage 8, and an interface 9.

For example, each of the above-described electromagnetic valve drive system 1 and other control devices is implemented in the computer 5. An operation of each processing unit described above is stored in the storage 8 in the form of a program. The CPU 6 reads a program from the storage 8, loads the read program into the main memory 7, and executes the above processing according to the program. Further, CPU 6 secures a storage area corresponding to each above-described storage unit in the main memory 7 according to the program.

Examples of the storage 8 include a hard-disk drive (HDD), a solid-state drive (SSD), a magnetic disk, an optical magnetic disk, a compact disc read-only memory (CD-ROM), a digital versatile disc read-only memory (DVD-ROM), a semiconductor memory, and the like. The storage 8 may be an internal medium directly connected to a bus in the computer 5 or may be an external medium connected to the computer 5 via an interface 9 or via a communication line. Further, in a case where this program is delivered to the computer 5 through a communication line, the computer 5 receiving the delivered program may load the program into the main memory 7 and execute the above processing. In at least one embodiment, the storage 8 is a non-transitory tangible storage medium.

Further, the above program may implement a part of the above-described functions. Further, the program may be a so-called difference file (difference program), which can implement the above-described functions in combination with a program already recorded in the computer system.

Although some embodiments of the present disclosure have been described, these embodiments are examples and do not limit the scope of the disclosure. These embodiments may be subject to various additions, various omissions, various replacements, and various changes without departing from the gist of the disclosure.

ADDITIONAL NOTES

The abnormality detection system (1) described in each embodiment of the present disclosure is understood as follows, for example.

(1) An abnormality detection system (1) according to a first aspect includes an electromagnetic valve (10), a power supply (+5 V) that applies a voltage to a load terminal of the electromagnetic valve (10) via a switch circuit (30) and a diode (40), a drive circuit (20) that drives the electromagnetic valve (10) via the load terminal, a first detecting unit (70a) that detects a voltage indicating a state of the drive circuit (20), a second detecting unit (70c) that detects a voltage associated with a voltage of the load terminal of the electromagnetic valve (10), and a determination unit (70e) that determines whether or not the load terminal is in a ground fault state based on a detection result by the first detecting unit (70a) and a detection result by the second detecting unit (70c) in a case where the switch circuit (30) is in an ON state.

Accordingly, the abnormality detection system (1) can detect the abnormality including the ground fault state in the load terminal of the electromagnetic valve (10).

(2) The abnormality detection system (1) according to a second aspect is the abnormality detection system (1) of (1), and in a case where the switch circuit (30) is in an OFF state, the determination unit (70e) may determine whether or not the abnormality detection system (1) is normal, whether or not there is a possibility that the load terminal is in a ground fault state, or whether or not another abnormality has occurred.

Accordingly, the abnormality detection system (1) can determine whether or not the abnormality detection system (1) is normal, whether or not there is a possibility that the load terminal is in the ground fault state, or whether or not another abnormality has occurred.

(3) The abnormality detection system (1) according to a third aspect is the abnormality detection system (1) of (2), and the other abnormality may be an abnormality in a path between the first detecting unit (70a) and the load terminal.

Accordingly, the abnormality detection system (1) can further clarify the other abnormality.

(4) The abnormality detection system (1) according to a fourth aspect is the abnormality detection system (1) of (2), and the other abnormality may be an abnormality of the switch circuit (30) or the diode (40).

Accordingly, the abnormality detection system (1) can further clarify the other abnormality.

(5) The abnormality detection system (1) according to a fifth aspect is the abnormality detection system (1) of any one of (1) to (4), and may include a drive unit (70d) that causes the drive circuit (20) to drive the electromagnetic valve (10). In a case where the drive unit (70d) causes the drive circuit (20) to drive the electromagnetic valve (10), the determination unit (70e) may determine whether the electromagnetic valve (10) is in an overcurrent state or an overheated state.

Accordingly, the abnormality detection system (1) can determine whether the electromagnetic valve (10) is in the overcurrent state or the overheated state.

(6) A determination device (70) according to a sixth aspect is a determination device (70) included in an abnormality detection (1) that includes an system electromagnetic valve (10), a power supply (+5 V) that applies a voltage to a load terminal of the electromagnetic valve (10) via a switch circuit (30) and a diode (40), and a drive circuit (20) that drives the electromagnetic valve (10) via the load terminal. The device (70) includes a first detecting unit (70a) that detects a voltage indicating a state of the drive circuit (20), a second detecting unit (70c) that detects a voltage associated with a voltage of the load terminal of the electromagnetic valve (10), and a determination unit (70e) that determines whether or not the load terminal is in a ground fault state based on a detection result by the first detecting unit (70a) and a detection result by the second detecting unit (70c) in a case where the switch circuit (30) is in an ON state.

Accordingly, the determination device (70) can detect the abnormality including the ground fault state in the load terminal of the electromagnetic valve (10).

(7) An abnormality detection method performed by an abnormality detection system (1) according to a seventh aspect is an abnormality detection method performed by an abnormality detection system (1) that includes an electromagnetic valve (10) and a power supply (+5 V) that applies a voltage to a load terminal of the electromagnetic valve (10) via a switch circuit (30) and a diode (40). The method includes driving the electromagnetic valve (10) via the load terminal, detecting a voltage indicating a state of a drive circuit (20) that drives the electromagnetic valve (10) via the load terminal, detecting a voltage associated with a voltage of the load terminal of the electromagnetic valve (10), and determining whether or not the load terminal is in a ground fault state based on a detection result obtained by detecting the voltage indicating the state of the drive circuit (20) and a detection result obtained by detecting the voltage associated with the voltage of the load terminal of the electromagnetic valve (10) in a case where the switch circuit (30) is in an ON state.

Accordingly, the abnormality detection method performed by the abnormality detection system (1) can detect the abnormality including the ground fault state in the load terminal of the electromagnetic valve (10).

(8) A determination method performed by a determination device (70) according to an eighth aspect is a determination method performed by a determination device (70) included in an abnormality detection system (1) that includes an electromagnetic valve (10), a power supply (+5 V) that applies a voltage to a load terminal of the electromagnetic valve (10) via a switch circuit (30) and a diode (40), and a drive circuit (20) that drives the electromagnetic valve (10) via the load terminal. The method includes detecting a voltage indicating a state of the drive circuit (20), detecting a voltage associated with a voltage of the load terminal of the electromagnetic valve (10), and determining whether or not the load terminal is in a ground fault state based on a detection result obtained by detecting the voltage indicating the state of the drive circuit (20) and a detection result obtained by detecting the voltage associated with the voltage of the load terminal of the electromagnetic valve (10) in a case where the switch circuit (30) is in an ON state.

Accordingly, the determination method performed by the determination device (70) can detect the abnormality including the ground fault state in the load terminal of the electromagnetic valve (10).

(9) A program according to a ninth aspect causes a computer of an abnormality detection system (1) that includes an electromagnetic valve (10), a power supply (+5 V) that applies a voltage to a load terminal of the electromagnetic valve (10) via a switch circuit (30) and a diode (40), and a drive circuit (20) that drives the electromagnetic valve (10) via the load terminal to execute detecting a voltage indicating a state of the drive circuit (20), detecting a voltage associated with a voltage of the load terminal of the electromagnetic valve (10), and determining whether or not the load terminal is in a ground fault state based on a detection result obtained by detecting the voltage indicating the state of the drive circuit (20) and a detection result obtained by detecting the voltage associated with the voltage of the load terminal of the electromagnetic valve (10) in a case where the switch circuit (30) is in an ON state.

Accordingly, the program can detect the abnormality including the ground fault state in the load terminal of the electromagnetic valve (10).

INDUSTRIAL APPLICABILITY

According to the abnormality detection system, the determination device, the abnormality detection method, the determination method, and the program according to the present disclosure, it is possible to detect an abnormality including a ground fault state in the load terminal of the electromagnetic valve.

REFERENCE SIGNS LIST

1: Electromagnetic valve drive system
5: Computer
6, 70: CPU
7: Main memory
8: Storage
9: Interface
10, 10a, 10b: Electromagnetic valve
20, 20a, 20b: Drive circuit
30, 30a, 30b: Switch circuit
40, 40a, 40b: Diode
50, 50a, 50b, 60, 60a, 60b: Pull-up resistor
70a, 70a1: First detecting unit
70b, 70b1: First drive unit
70c, 70c1: Second detecting unit
70d, 70d1: Second drive unit
70e, 70e1, 70e2: Determination unit
70a2: Third detecting unit
70b2: Third drive unit
70c2: Fourth detecting unit
70d2: Fourth drive unit
80, 90: Resistor

The invention claimed is:
1. An abnormality detection system, comprising:
an electromagnetic valve;
a power supply that applies a voltage to a load terminal of the electromagnetic valve via a switch circuit and a diode;
a drive circuit that drives the electromagnetic valve via the load terminal;

a storage configured to store instructions; and
a processor configured to execute the stored instructions to:
detect a voltage indicating a state of the drive circuit;
detect a voltage associated with a voltage of the load terminal of the electromagnetic valve; and
determine whether or not the load terminal is in a ground fault state based on a detection result obtained by detecting the voltage indicating the state of the drive circuit and a detection result obtained by detecting the voltage associated with the voltage of the load terminal of the electromagnetic valve in a case where the switch circuit is in an ON state.

2. The abnormality detection system according to claim 1, wherein, in a case where the switch circuit is in an OFF state, the processor determines whether or not the abnormality detection system is normal, whether or not there is a possibility that the load terminal is in a ground fault state, or whether or not another abnormality has occurred.

3. The abnormality detection system according to claim 2, wherein the other abnormality is an abnormality in a path between the processor and the load terminal.

4. The abnormality detection system according to claim 3, wherein, in a case where the processor causes the drive circuit to drive the electromagnetic valve, the processor determines whether the electromagnetic valve is in an overcurrent state or an overheated state.

5. The abnormality detection system according to claim 2, wherein the other abnormality is an abnormality of the switch circuit or the diode.

6. The abnormality detection system according to claim 5, wherein, in a case where the processor causes the drive circuit to drive the electromagnetic valve, the processor determines whether the electromagnetic valve is in an overcurrent state or an overheated state.

7. The abnormality detection system according to claim 2, wherein, in a case where the processor causes the drive circuit to drive the electromagnetic valve, the processor determines whether the electromagnetic valve is in an overcurrent state or an overheated state.

8. The abnormality detection system according to claim 1, wherein, in a case where the processor causes the drive circuit to drive the electromagnetic valve, the processor determines whether the electromagnetic valve is in an overcurrent state or an overheated state.

9. A determination device included in an abnormality detection system that includes an electromagnetic valve, a power supply that applies a voltage to a load terminal of the electromagnetic valve via a switch circuit and a diode, and a drive circuit that drives the electromagnetic valve via the load terminal, the device comprising:
a storage configured to store instructions; and
a processor configured to execute the stored instructions to:
detect a voltage indicating a state of the drive circuit;
detect a voltage associated with a voltage of the load terminal of the electromagnetic valve; and
determine whether or not the load terminal is in a ground fault state based on a detection result obtained by detecting the voltage indicating the state of the drive circuit and a detection result obtained by detecting the voltage associated with the voltage of the load terminal of the electromagnetic valve in a case where the switch circuit is in an ON state.

10. An abnormality detection method performed by an abnormality detection system that includes an electromagnetic valve and a power supply that applies a voltage to a load terminal of the electromagnetic valve via a switch circuit and a diode, the method comprising:
driving the electromagnetic valve via the load terminal;
detecting a voltage indicating a state of a drive circuit that drives the electromagnetic valve via the load terminal;
detecting a voltage associated with a voltage of the load terminal of the electromagnetic valve; and
determining whether or not the load terminal is in a ground fault state based on a detection result obtained by detecting the voltage indicating the state of the drive circuit and a detection result obtained by detecting the voltage associated with the voltage of the load terminal of the electromagnetic valve in a case where the switch circuit is in an ON state.

11. A determination method performed by a determination device included in an abnormality detection system that includes an electromagnetic valve, a power supply that applies a voltage to a load terminal of the electromagnetic valve via a switch circuit and a diode, and a drive circuit that drives the electromagnetic valve via the load terminal, the method comprising:
detecting a voltage indicating a state of the drive circuit;
detecting a voltage associated with a voltage of the load terminal of the electromagnetic valve; and
determining whether or not the load terminal is in a ground fault state based on a detection result obtained by detecting the voltage indicating the state of the drive circuit and a detection result obtained by detecting the voltage associated with the voltage of the load terminal of the electromagnetic valve in a case where the switch circuit is in an ON state.

12. A non-transitory recording medium storing a program for a computer of an abnormality detection system that includes an electromagnetic valve, a power supply that applies a voltage to a load terminal of the electromagnetic valve via a switch circuit and a diode, and a drive circuit that drives the electromagnetic valve via the load terminal, the program causing the computer to execute:
detecting a voltage indicating a state of the drive circuit;
detecting a voltage associated with a voltage of the load terminal of the electromagnetic valve; and
determining whether or not the load terminal is in a ground fault state based on a detection result obtained by detecting the voltage indicating the state of the drive circuit and a detection result obtained by detecting the voltage associated with the voltage of the load terminal of the electromagnetic valve in a case where the switch circuit is in an ON state.

* * * * *